United States Patent
Kawamoto et al.

(10) Patent No.: US 6,796,119 B2
(45) Date of Patent: Sep. 28, 2004

(54) STATOR SUPPORT STRUCTURE FOR TORQUE CONVERTER

(75) Inventors: Takeshi Kawamoto, Yao (JP); Shinji Fujimoto, Hirakata (JP); Hideki Miura, Hirakata (JP)

(73) Assignee: Exedy Corporation, Osaka (JP)

( * ) Notice: Subject to any disclaimer, the term of this patent is extended or adjusted under 35 U.S.C. 154(b) by 7 days.

(21) Appl. No.: 10/443,738

(22) Filed: May 23, 2003

(65) Prior Publication Data

US 2003/0196431 A1 Oct. 23, 2003

Related U.S. Application Data

(63) Continuation of application No. 09/904,840, filed on Jul. 16, 2001.

(30) Foreign Application Priority Data

| Jul. 27, 2000 | (JP) | 2000-226370 |
| May 14, 2001 | (JP) | 2001-142839 |

(51) Int. Cl.[7] .................................... F16D 31/02
(52) U.S. Cl. ........................................ 60/345
(58) Field of Search ............................. 60/345

(56) References Cited

U.S. PATENT DOCUMENTS 5,852,932 A * 12/1998 Matsumoto .................. 60/345
6,125,980 A * 10/2000 Ruth et al. ................... 60/345

* cited by examiner

*Primary Examiner*—F. Daniel Lopez
(74) *Attorney, Agent, or Firm*—Shinjyu Global IP Counselors, LLP (57) ABSTRACT

A stator support structure of a torque converter is configured to reduce the number of parts and an axial size of the stator support structure. The stator support structure has a first support member 5, a second support member 7 and a one-way clutch body 8. The first support member 5 has a first annular flange 11 extending radially outward and a first thrust receiving portion 13. The second support member 7 has a second annular flange 15 formed of an inner peripheral portion of the stator extending radially inward and opposed to the first annular flange 11, and a second thrust receiving portion 17 being in contact with the first thrust receiving portion 13. The one-way clutch body 8 is disposed between the first and second annular flanges 11 and 15, and is subjected to an axial load in a locked state for inhibiting rotation of the stator only in one direction.

21 Claims, 6 Drawing Sheets

STATOR SUPPORT STRUCTURE FOR TORQUE CONVERTER

CROSS-REFERENCE TO RELATED APPLICATIONS

This application is a continuation application of U.S. patent application Ser. No. 09/904,840 filed on Jul. 16, 2001. The entire disclosure of U.S. patent application Ser. No. 09/904,840 is hereby incorporated herein by reference.

BACKGROUND OF THE INVENTION

1. Field of the Invention

The present invention relates to a stator support structure. More specifically, the present invention relates to a stator support structure of a torque converter for fixing a stator to a stationary shaft and carrying it on an impeller hub and a turbine hub.

2. Background Information

A torque converter is a fluid coupling mechanism that transmits torque between the crankshaft of an engine and the input shaft of an automatic transmission. A torque converter typically has three types of runners (impeller, turbine, stator) located inside for transmitting the torque by means of an internal hydraulic oil or fluid. The impeller is fixedly coupled to the front cover that receives the input torque from the crankshaft of an engine. The hydraulic chamber formed by the impeller shell and the front cover is filled with hydraulic oil or fluid. The turbine is disposed opposite the front cover in the hydraulic chamber. When the front cover and the impeller rotate together, the hydraulic oil flows from the impeller to the turbine, and the turbine rotates. As a result, the torque is transmitted from the turbine to the main drive shaft of the transmission.

The stator regulates the direction of liquid flowing from the turbine toward the impeller. Thereby, a large torque ratio is obtained when the impeller rotates fast and the turbine rotates slowly, and the torque ratio decreases as a difference between the rotation speeds of them decreases.

In general, the stator is formed of a stator carrier of a disk-like form and a plurality of blades fixed to the outer periphery of the stator carrier. Before the rotation speed of the turbine approaches the rotation speed of the impeller, the fluid collides with concave surfaces of the blades of the stator. In this state, rotation of the stator is inhibited. When the rotation speed of the turbine increases, the fluid starts to collide with rear surfaces, i.e., convex surfaces of the blades so that the flow of fluid changes to increase the resistance. Therefore, the rotation of the stator is allowed to eliminate the resistance.

A one-way clutch is used for selectively inhibiting and allowing the rotation of the stator depending on the direction of the fluid flow.

The one-way clutch in the prior art is generally formed of a first race or support member coupled to a stationary shaft, a second race or support member fixed by press-fitting or the like to an inner periphery of a stator carrier, and engagement members such as ratchet claws, rollers or the like disposed between the first and second support members. A retainer is arranged on a side of the one-way clutch for axially positioning the one-way clutch and carrying a thrust load. Further, thrust bearings are arranged between a group including these members and a group including the turbine hub and the impeller hub.

The conventional stator support structure including the one-way clutch is formed of many components, and particularly it is difficult to reduce the axial size of the torque converter. In Japanese Laid-Open Patent Publication Nos. 5-45306 (1993-45306) and 11-2303 (1999-2303) and others, therefore, such a structure is already proposed that a pair of axially opposed surfaces are formed, and a one-way clutch is arranged between these surfaces.

The structure disclosed in the above publications is likewise configured such that the one-way clutch receives an axial load when it is locked, and therefore a retainer and a thrust bearing must be arranged so that the thrust load generated by the fluid may not act on the one-way clutch. Therefore, the number of parts is not sufficiently reduced. Although the Japanese Laid-Open Patent Publication No. 11-2303 has does not disclose a retainer and thrust bearings, a retainer and thrust bearings are required when attaching the one-way clutch disclosed in this publication to the torque converter.

In view of the above, there exists a need for a stator support structure of a torque converter which overcomes the above mentioned problems in the prior art. This invention addresses this need in the prior art as well as other needs, which will become apparent to those skilled in the art from this disclosure.

SUMMARY OF THE INVENTION

An object of the present invention is to reduce the number of parts in a structure for supporting a stator, and particularly to reduce an axial size of the torque converter.

According to a first aspect of the present invention, a stator support structure for coupling a stator of a torque converter to a stationary shaft and supporting the stator on an impeller hub and a turbine hub includes a first support member, a second support member and a one-way clutch body. The first support member has a first annular flange coupled nonrotatably to the stationary shaft and extending radially outward, and a first thrust receiving portion for receiving a thrust load. The second support member has a second annular flange formed of an inner peripheral portion of the stator extending radially inward and opposed to the first annular flange, and a second thrust receiving portion being in contact with the first thrust receiving portion for receiving the thrust load. The one-way clutch body is disposed between the first and second annular flanges, and is subjected to an axial load in a locked state for inhibiting rotation of the stator only in one direction.

In this stator structure, when a thrust load is applied to the stator as a result of the operation of the torque converter, the thrust load is caused by the contact between the first thrust receiving portion of the first support member and the second thrust receiving portion of the second support member, and is not applied to the one-way clutch body arranged between the first and second support members.

This structure does not require a retainer, which is employed in the prior art. Since the second support member is integrated with the stator, required parts can be small in number. Since the parts are small in number, the axial size of the torque converter can be small.

According to a second aspect of the present invention, the stator support structure of the first aspect of the present invention further includes a pair of thrust bearings each arranged between the first or second support member and corresponding one of the impeller hub and the turbine hub.

In this structure, the thrust load acting on each support member is applied through the thrust bearing to the impeller hub or the turbine hub.

According to a third aspect of the present invention, the stator support structure of the first or second aspect of the present invention further has such a structure that the second annular flange of the second support member is provided with a plurality of circumferentially spaced concavities. The one-way clutch body has a plurality of ratchet claws and a plurality of notches. The ratchet claws are arranged within the concavities of the second annular flange, respectively, and have ends capable of projecting toward and escaping from the first annular flange. The notches are formed on the first annular flange of the first support member, and are engaged with the ratchet claws only in one of the rotating directions, respectively.

In this structure, since the ratchet claws are arranged within the concavities of the second annular flange, a member dedicated to arrangement of the ratchet claws is not required so that required parts can be small in number.

According to a fourth aspect of the present invention, the stator support structure of the third aspect of the present invention further has such a feature that the stator and the second support member are made of resin. In this structure, since the second support member is made of resin, the concavities for arranging the ratchet claws can be easily formed.

According to a fifth aspect of the present invention, a stator support structure for coupling a stator of a torque converter to a stationary shaft and supporting the stator on an impeller hub and a turbine hub includes a first support member, a second support member, a one-way clutch body and a retainer. The first support member has a first annular flange coupled nonrotatably to the stationary shaft and extending radially outward. The second support member has a second annular flange formed of an inner peripheral portion of the stator extending radially inward and opposed to the first annular flange, and a second thrust receiving portion for receiving a thrust load. The one-way clutch body is disposed between the first and second annular flanges, and is subjected to an axial load in a locked state for inhibiting rotation of the stator only in one direction. The retainer is in contact with the thrust receiving portion of the second support member for receiving the thrust load. The stator, the second support member and the retainer are made of resin. The side surface of the second annular flange of the second support member can be in direct contact with one of the inner side surface of the turbine hub and the inner side surface of the impeller hub, and the retainer can be in direct contact with the other of the inner side surface of the turbine hub and the inner side surface of the impeller hub.

In this structure, since the second support member and the retainer are made of resin, these can be in direct contact with the turbine hub and the impeller hub. Therefore, two thrust bearings, which are employed in a conventional structure, are not required so that the parts can be reduced in number, and the axial size can be reduced.

The thrust load, which is caused by the operation of the torque converter, is caused by the thrust receiving portion of the second support member and the retainer, and can be prevented from acting on the one-way clutch body.

According to a sixth aspect of the present invention, the stator support structure of the fifth aspect of the present invention further has such a feature that the retainer is in direct contact with the inner side surface of the impeller hub, and the resin forming the stator and the second support member has lower slidability than the resin forming the retainer.

In the torque converter, the inner side surface of the impeller hub is subjected to a larger thrust load than the inner side surface of the turbine hub. Therefore, the member in direct contact with the inner side surface of the impeller hub must have higher slidability that the member in contact with the inner side surface of the turbine hub. However, the structure, in which the members in contact with the inner side surfaces are made of resin, is expensive if a large amount of resin having high slidability is to be used. Accordingly, the resin having high slidability is used only for the retainer having smaller sizes than the stator and the second support member, resin having lower slidability than the resin of the retainer is used for the stator and the second support member. Thereby, the increase in manufacturing cost of the stator support structure using resin materials can be minimized while keeping intended function of bearing the large thrust load occurred on the impeller hub side.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

First Embodiment

Figure 1:
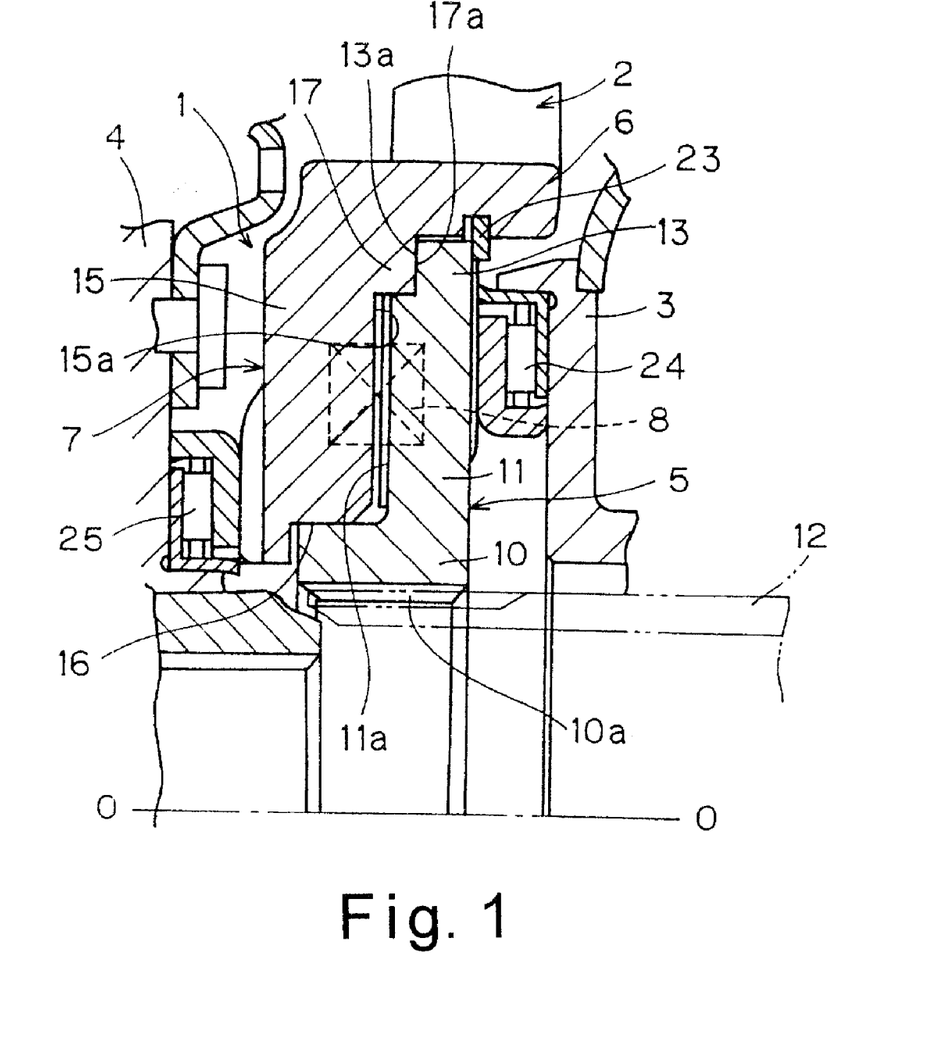
FIG. 1 is a fragmentary cross sectional view of a stator support portion of a torque converter employing a stator support structure of a first embodiment of the present invention.

Referring initially to FIG. 1, a torque converter employing a stator support mechanism is illustrated to explain a first embodiment of the present invention.

FIG. 1 fragmentarily shows a torque converter employing a stator support mechanism of a first embodiment of the invention. In FIG. 1, a center line O—O indicates a rotation center line.

The stator support structure primarily has a one-way clutch 1. The one-way clutch 1 is located radially inside a stator 2 and axially between an impeller hub 3 and a turbine hub 4. The stator support structure has a first support member 5, a second support member 7 and a one-way clutch body 8. The second support member 7 is integrated with a stator carrier 6 that is formed radially inside of the stator 2. The one-way clutch body 8 is disposed axially between the first and second support members 5 and 7.

The first support member 5 has a cylindrical portion 10 and a first annular flange 11. The first annular flange 11 is a disk-shaped member, which extends radially outward from the outer periphery of the cylindrical portion 10. The first support member 5 is made of cemented steel, sintered alloy or the like.

The cylindrical portion 10 is provided at its inner periphery with splines or teeth 10a, which are nonrotatably and axially movably engaged with outer splines or teeth of a stationary shaft 12. The stationary shaft 12 has a cylindrical form with an end fixed to a front housing (not shown) of a transmission.

The first annular flange 11 is provided at its radially outer end with a first thrust receiving portion 13, which has an axially smaller width than the inner end of the first annular flange 11. The first annular flange 11 has a first flange surface 11a directed toward the turbine hub 4. The first thrust receiving portion 13 has a first thrust receiving surface 13a directed toward the turbine hub 4.

The second support member 7 is formed by extending radially inwardly a portion of the stator carrier 6, and has a second annular flange 15. The second annular flange 15 is a disk-shaped member. The stator 2 and the second support member 7 are generally made of cast aluminium articles, but can be made of molded resin articles. In this embodiment, the stator 2 and the second support member 7 are integrally made of cast aluminium articles or molded resin articles. The second annular flange 15 is provided at its inner periphery with an annular recess or socket portion 16 for centering the second annular flange 15 on the cylindrical portion 10 of the first support member 5. The second annular flange 15 is also provided at its radially outer end (base end side of the flange) with a second thrust receiving portion 17 having an axial width larger than the inner portion of the second annular flange 15. The second annular flange 15 has a second flange surface 15a directed toward the impeller hub 3. The second thrust receiving portion 17 has a second thrust receiving surface 17a directed toward the impeller hub 3. The second flange surface 15a is opposed to the first flange surface 11a of the first support member 5 with a predetermined spa e therebetween. The second thrust receiving surface 17a is in contact with the first thrust receiving surface 13a of the first support member 5 for maintaining the predetermined space between the second flange surface 15a and the first flange surface 11a. Thus, an axial thrust load between the first support member 5 and the second support member 7 is supported at the first and second flange surfaces 11a and 15a. The cylindrical portion 10 of the firs support member 5 is fitted into the socket portion 16 of the second annular flange 15 for cent ring (i.e., radially positioning) these members.

Figure 2:
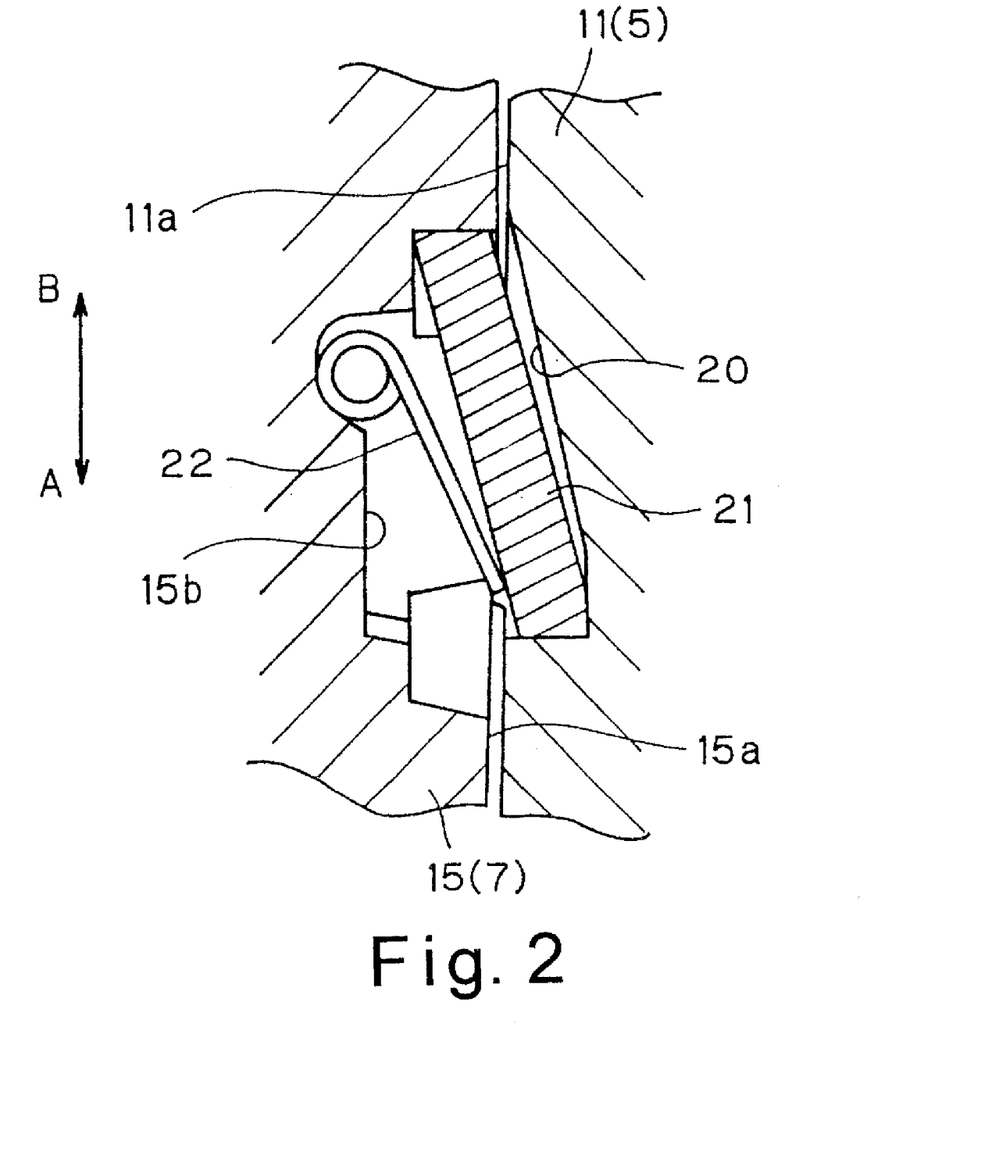
FIG. 2 is an enlarged fragmentary cross sectional view of a one-way clutch body used in the stator support structure illustrated in FIG. 1.
Figure 3:
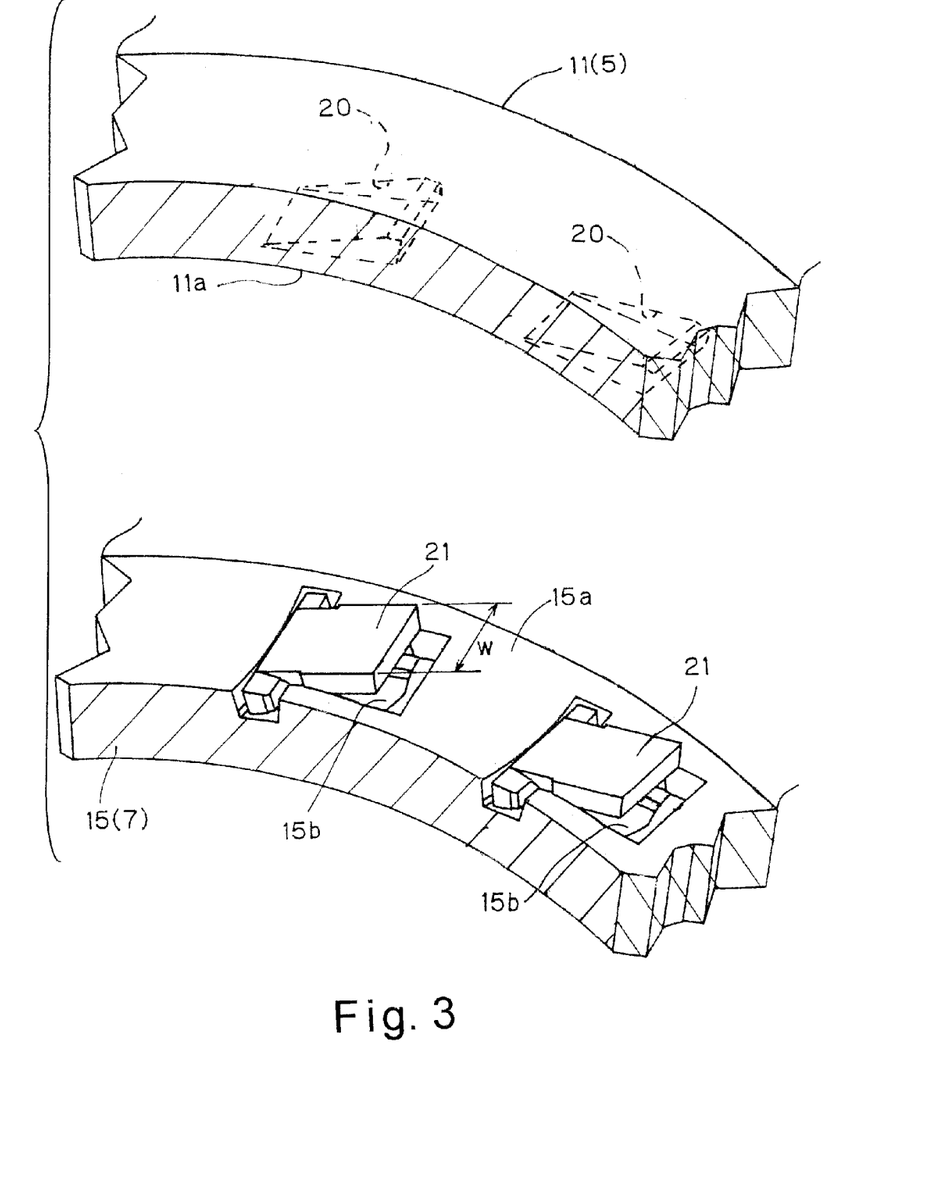
FIG. 3 is an exploded fragmentary perspective view of the one-way clutch body illustrated in FIG. 2.

Description will now be given on the one-way clutch body 8 with reference to FIGS. 2 and 3. The one-way clutch body 8 can inhibit the rotation of the stator in one direction when it is locked by an axial load applied thereto. The one-way clutch body 8 has a plurality of notches 20 and a plurality of ratchet claws 21 which are equal in number to the notches 20. The notches 20 are formed in the first flange surface 11a of the first annular flange 11 of the first support member 5. The ratchet claws 21 are arranged on the second flange surface 15a of the second annular flange 15 of the second support member 7.

Each notch 20 is formed of a groove having a square section and a depth, which gradually increases as the position moves in the direction of allowed relative rotation. The width (radial length) of each notch 20 is larger than a width W (see FIG. 3) of the ratchet claw 21. The ratchet claws 21 are pivotally accommodated in pockets 15b (concavities) formed in the second flange surface 15a of the second annular flange 15. A spring member 22 is arranged between each ratchet claw 21 and the bottom of each pocket 15b so that the spring members 22 force the ratchet claws 21 outwardly to bring their ends into contact with the notches 20.

The first support member 5, the second support member 7 and the one-way clutch body 8 form a unit structure, which is achieved by attaching the one-way clutch body 8 to the pockets 15b of the second support member 7, and fitting the first support member 5 into the socket portion 16 of the second support member 7. After the above unit structure is completed, a snap ring 23 is fitted into an annular groove formed at the inner periphery of the stator carrier 6 so that the support members 5 and 7 are fixed together.

The stator support structure has a first thrust bearing 24 arranged between the first support member 5 and the inner surface of the impeller hub 3, and a second thrust bearing 25 arranged between the second support member 7 and the inner surface of the turbine hub 4. The first thrust bearing 24 has an outer periphery supported by the impeller hub 3, and the second thrust bearing 25 has an inner periphery supported by the turbine hub 4.

Operations will now be described. When the impeller rotates fast and the turbine rotates slowly, the fluid collides with the concave surfaces of the blades of the stator so that the second support member 7 receives a rotation force in a direction of an arrow A in FIG. 2. In this case, the ratchet claws 21 arranged on the second support member 7 are engaged with the grooves of the notches 20, and thereby inhibit the rotation of the stator. Therefore, the stator regulates the flowing direction of the fluid flowing from the turbine toward the impeller so that a large torque ratio is obtained, As the rotation speed of the turbine get closer to that of the impeller, such a situation starts that the fluid flowing from the turbine collides with the rear surfaces of the blades. Thereby, the second support member 7 receives a rotational force in a direction of an arrow B in FIG. 2. In this case, each ratchet claw 21 moves along the inclined bottom surface of the notch 20 against the biasing force of the spring member 22. Accordingly, the rotation of the stator 2 is allowed, and such a situation is suppressed that the fluid returning from the turbine toward the impeller is subjected to the resistance of the blades.

In the operations described above, a thrust load acts between the first and second support members 5 and 7, and is caused by the first and second thrust receiving surfaces 13a and 17a formed on the first and second support members 5 and 7.

In this embodiment, the first and second support members 5 and 7 are provided with the flange surfaces 11a and 15a, on which the one-way clutch body 8 is arranged, and the thrust receiving surfaces 13a and 17a receiving the thrust load, respectively. Therefore, a retainer employed in the conventional structure is not required. Since the second support member 7 is integral with a portion of the stator carrier 6, required parts can be smaller in number than those in the conventional structure.

Second Embodiment

Figure 4:
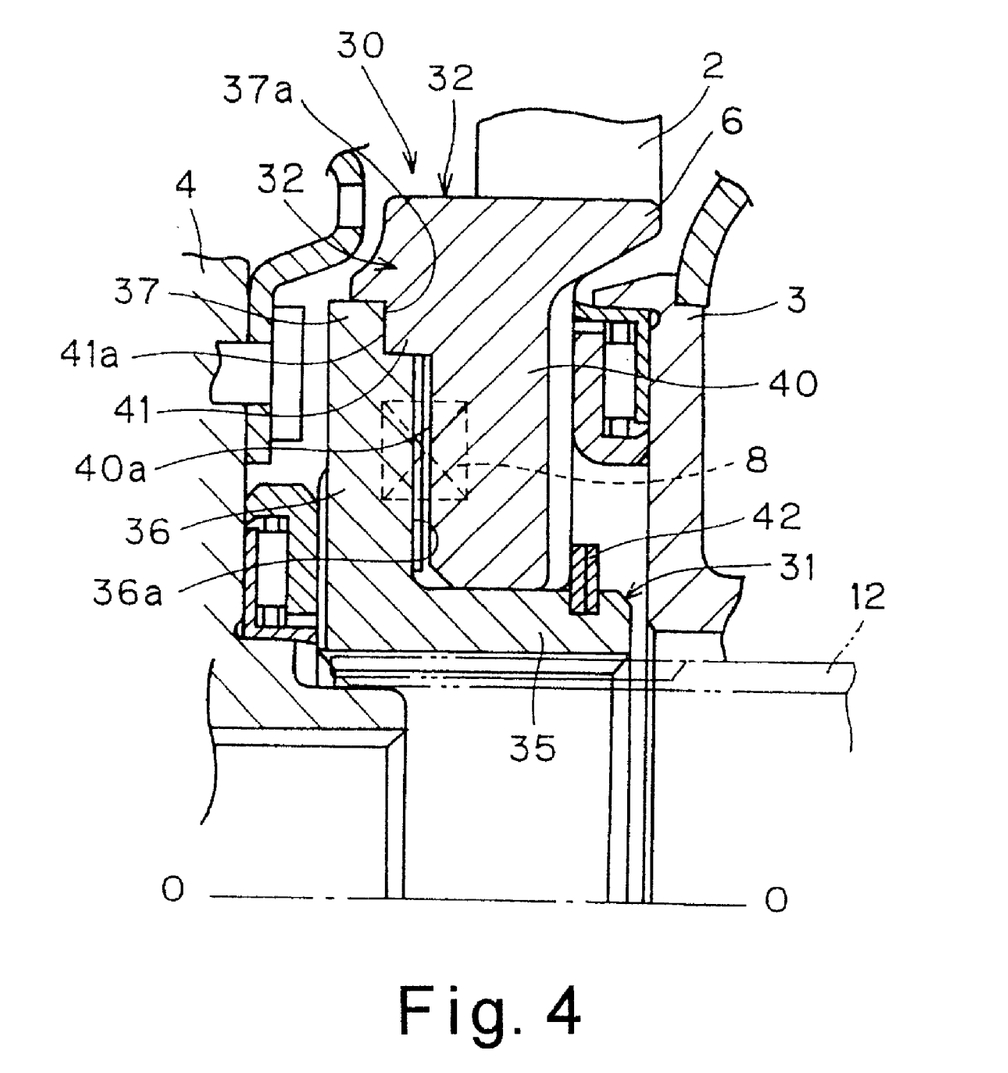
FIG. 4 is a fragmentary cross sectional view of a stator support portion of a torque converter employing a stator support structure of a second embodiment of the present invention.

Referring now to FIG. 4, a torque converter employing a stator support mechanism in accordance with a second embodiment will now be explained. In view of the similarity between the first and second embodiments, the parts of the second embodiment that are identical in function to the parts of the first embodiment will be given the same reference numerals as the parts of the first embodiment. Moreover, the descriptions of the parts of the second embodiment that are identical to the parts of the first embodiment may be omitted for the sake of brevity.

The stator support structure of the second embodiment is basically the same as that of the first embodiment. A one-way clutch 30 in this embodiment is basically the same as the one-way clutch 1 of the first embodiment. The structure of the second embodiment differs from that of the first embodiment only in the forms and arrangements of the first and second support members 31 and 32. Description will now be given on only the differences.

The first support member 31 has a cylindrical portion 35 provided at its inner periphery with splines or teeth, and a first annular flange 36 extending radially outward from the outer periphery of the cylindrical portion 35. The first annular flange 36 is provided at its radially outer end with a first thrust receiving portion 37 having a small axial size or width. The first annular flange 36 has a first flange surface 36a directed toward the impeller hub 3, and the first thrust receiving portion 37 has a first thrust receiving surface 37a directed toward the impeller hub 3.

The second support member 32 is formed of a portion of the stator carrier 6, which extends radially inward, and has a second annular flange 40 that is a disk-shaped member. The second annular flange 40 is provided at its radially outer end (base end of the flange) with a second thrust receiving portion 41 having a small axial size or width. The second annular flange 40 has a second flange surface 40a directed toward the turbine hub 4, and the second thrust receiving portion 41 has a second thrust receiving surface 41a directed toward the turbine hub 4. The second flange surface 40a is opposed to the first flange surface 36a of the first support member 31 with a predetermined space therebetween. The second thrust receiving surface 41a is in contact with the first thrust receiving surface 37a of the first support member 31. The second annular flange 40 has a socket portion defined by its inner peripheral surface. The cylindrical portion 35 of the first support member 31 is fitted into this socket portion so that these portions or members are centered (radially positioned) with respect to each other.

The structure of the one-way clutch body 8 as well as the materials and others of the respective members are the same as those of the first embodiment.

The first support member 31, the second support member 32 and the one-way clutch body 8 are assembled into a unit structure by fitting the first support member 31 into the socket portion in the second support member 32 after arranging the one-way clutch body 8 in the socket portion of the second support member 32. After completing the above unit structure, a snap ring 42 is fitted into an annular groove formed on the cylindrical portion 35 of the first support member 31 so that the support members 31 and 32 are fixed together.

In addition to the operation and effect similar to those of the first embodiment, such an advantage can be achieved that the snap ring 42 can be attached to the first support member 31 of a large strength instead of the second support member 32 made of aluminium or resin. Accordingly, the portion for attaching the snap ring can be axially small.

Third Embodiment

Figure 5:
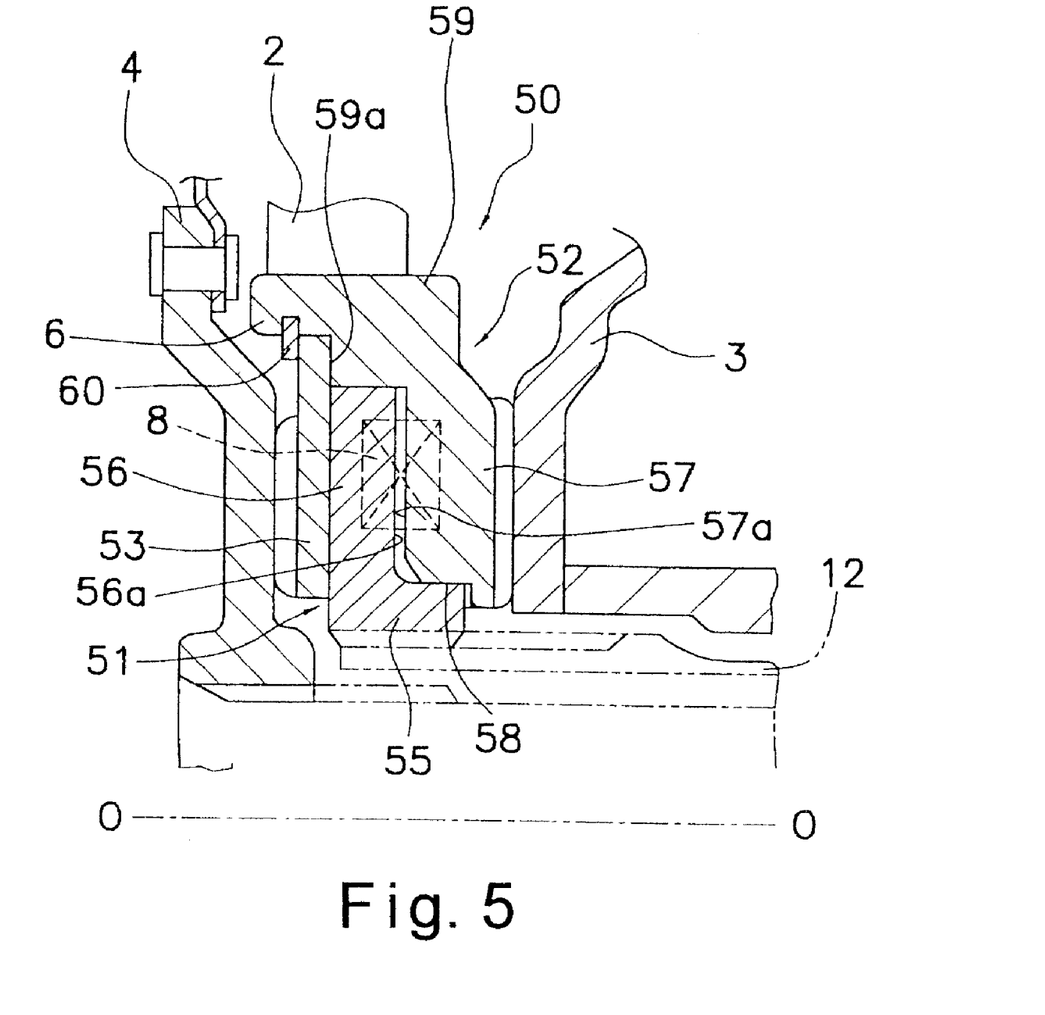
FIG. 5 is a fragmentary cross sectional view of a stator support portion of a torque converter employing a stator support structure of a third embodiment of the present invention.

Referring now to FIG. 5, a torque converter employing a stator support mechanism in accordance with a third embodiment will now be explained. In view of the similarity between the third embodiment and the prior embodiments, the descriptions of the parts of the third embodiment that are identical in function to the parts of the first embodiment may be omitted for the sake of brevity.

The stator support structure has a one-way clutch 50, a first support member 51, a second support member 52, the one-way clutch body 8 and a retainer 53. In contrast to the foregoing embodiments, the third embodiment of the invention does not employ a pair of the thrust bearings.

The first support member 51 is made of cemented steel, sintered alloy or the like, and has a cylindrical portion 55 provided at its inner periphery with spline teeth and a disk-like first annular flange 56 extending radially outward from the outer periphery of the cylindrical portion 55. The first annular flange 56 has a first flange surface 56a directed toward the impeller hub 3.

The second support member 52 extends radially inward from a portion of the stator carrier 6, and has a second annular flange 57 of a disk like form. The stator 2 and the second support member 57 are made of resin. The second annular flange 57 is provided at its inner periphery with a socket portion 58 for centering, and is provided at its radially outer end (base end side of the flange) with a thrust receiving portion 59 having an axially large thickness. The second annular flange 57 has a second flange surface 57a directed toward the turbine hub 4, and the thrust receiving portion 59 has a thrust receiving surface 59a directed toward the turbine hub 4.

The second flange surface 57a of the second support member 52 is opposed to the first flange surface 56a of the first support member 51 with a predetermined space therebetween. The surface opposite to the second flange surface 57a is in direct contact with the inner side surface of the impeller hub 3, and radial fluid grooves are formed for flowing the working fluid through between the impeller and the stationary shaft 12. The cylindrical portion 55 of the first support member 51 is fitted into the socket portion 58 of the second annular flange 57 for centering (i.e., radially positioning) these members.

In this embodiment, already described, the retainer 53 made of resin is arranged between the first support member 51 and the inner side surface of the turbine hub 4. The retainer 53 is a disk-like member, and one side surface of its radially outer portion is in contact with the thrust receiving surface 59. The retainer 53 may be in direct contact with the inner side surface of the turbine hub 4, and radial fluid grooves are formed for flowing the working fluid through between the turbine and the stationary shaft 12.

The one-way clutch body 8 has the same structure as those of the foregoing embodiments.

According to the above structure, the unit structure can be achieved in such a manner that the one-way clutch body 8 is assembled on the second support member 57, the first support member 51 is then fitted into the socket portion 58 of the second support member 57 and then the retainer 53 is attached. After the unit structure is formed, a snap ring 60 is attached to the annular groove formed at the inner periphery of the stator carrier 6 so that the first and second support members 51 and 52 as well as the retainer 53 are fixed.

In this embodiment, the second support member 52 and the retainer 53 are integrally made of resin, and can be in direct contact with the inner side surface of the impeller hub 3 and the inner side surface of the turbine hub 4, respectively. Therefore, a pair of thrust bearings employed in the prior art are not required so that the required parts can be reduced in number, and the axial size of the torque converter can also be reduced.

Fourth Embodiment

Figure 6:
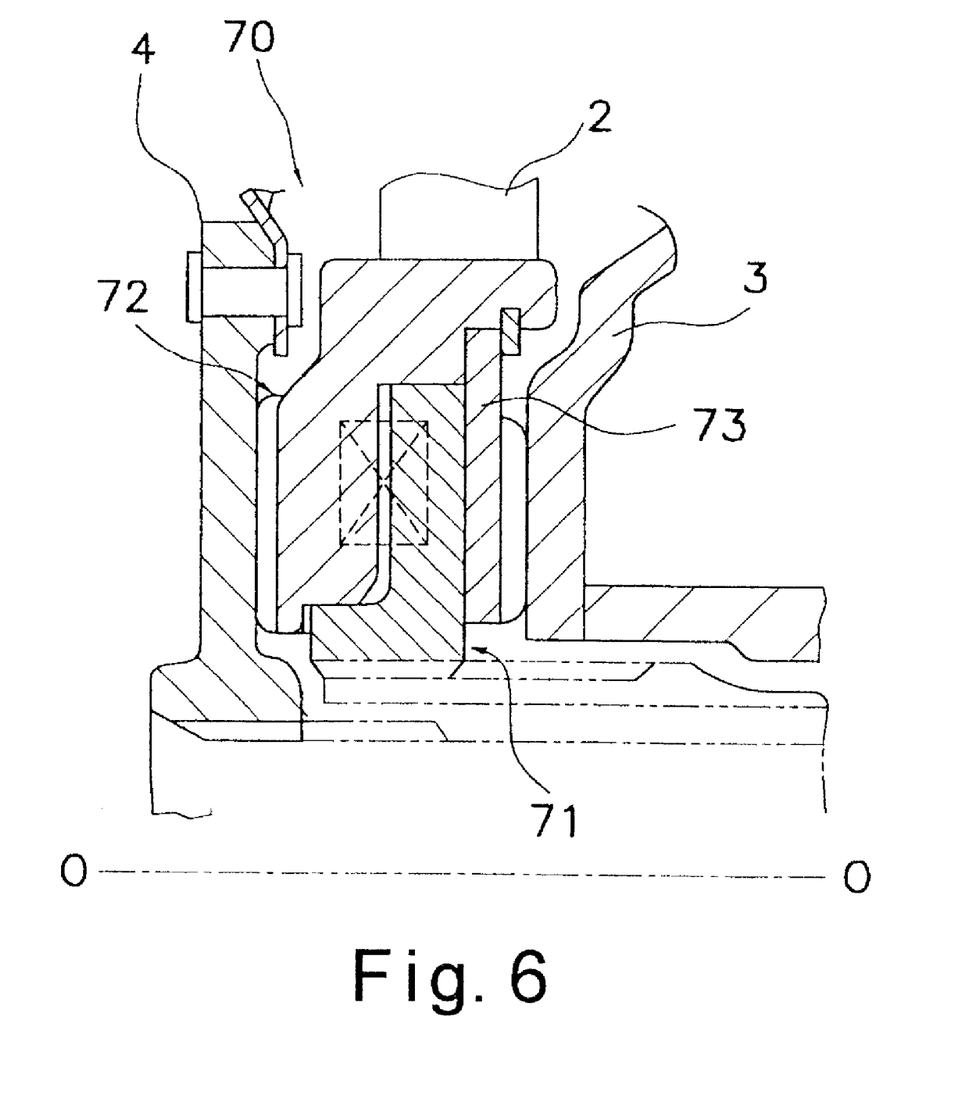
FIG. 6 is a fragmentary cross sectional view of a stator support portion of a torque converter employing a stator support structure of a fourth embodiment of the present invention.

Referring now to FIG. 6, a torque converter employing a stator support mechanism in accordance with a fourth embodiment will now be explained. In view of the similarity between the fourth embodiment and the prior embodiments, the descriptions of the parts of the fourth embodiment that are identical in function to the parts of the prior embodiments may be omitted for the sake of brevity.

This stator support structure is basically the same as that of the third embodiment. A one-way clutch 70 in this embodiment is the same as that of the foregoing embodiment except for the arrangements of the second support member 72 and the retainer 73 as well as the materials.

In this embodiment, the retainer 73 is arranged on the impeller hub side with respect to the first support member 71, and is in direct contact with the inner side surface of the impeller hub 3. The second support member 72 is arranged on the turbine hub side with respect to the first support member 71, and is direct contact with the inner side surface of the turbine hub 4.

Similarly to the third embodiment, the second support member 72 and the retainer 73 are made of resin, but are made of different kinds of resin in view of the thrust loads applied thereto, respectively. More specifically, the second support member 72 is made of thermosetting resin such as a phenolic resin, while the retainer 73 is made of thermosetting resin, such as a phenolic resin, in which carbon fibers have been added for improving the slidability (lowering the coefficient of friction). The stator 2 is preferably made of the same kind of resin as the second support member 72.

As described above, the retainer 73 is made of resin having high slidability, and the second support member 72 is made of resin having lower slidability that that of the retainer 73. In other words, the resin of the retainer 73 has a lower coefficient of friction (high slidability) than the coefficient of friction (low slidability) for the resin of the second support member 72.

In the torque converter, the inner side surface of the impeller hub 3 is subjected to a larger thrust load than the inner side surface of the turbine hub 4. Therefore, the member that directly contacts the inner side surface of the impeller hub 3 should have a higher slidability than the member that directly contacts the inner side surface of the turbine hub 4. However, if a large amount of resin having high slidability (low coefficient of friction) is used for the stator support structure, then manufacturing cost of the stator support structure would increase. Thus, the resin having high slidability (low coefficient of friction) is only used for the retainer 73, which is smaller in size than the stator 2 and the second support member 72. Resins having low slidability (high coefficient of friction) can be used for the stator 2 and the second support member 72 to reduce the manufacturing costs.

According to the stator support structure of the invention, as described above, the required parts can be reduced in number, and the axial size can also be reduced.

This application claims priority to Japanese Patent Application No. 2000-226370 and Japanese Patent Application No. 2001-142839. The entire disclosures of Japanese Patent Application No. 2000-226370 and Japanese Patent Application No. 2001-142839 are hereby incorporated herein by reference.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A stator support structure of a torque converter comprising:

a first support member having a first annular flange and a first thrust receiving portion, said first annular flange being configured to receive nonrotatably a stationary shaft and extend radially outward from the stationary shaft, said first annular flange having said first thrust receiving portion unitarily formed on said first annular flange, said first thrust receiving portion having an axial width smaller than that of said first annular flange, said first thrust receiving portion having a first thrust receiving surface formed on an axial side thereof, said first thrust receiving portion being configured to receive a thrust load;

a second support member having a second annular flange and a second thrust receiving portion, said second annular flange extending radially inward from an inner peripheral portion of a stator, said second annular flange being positioned to be axially opposed to said first annular flange, said second thrust receiving portion contacting said first thrust receiving portion to receive the thrust load, said second annular flange having said second thrust receiving portion unitarily formed on said second annular flange, said second thrust receiving portion having a second thrust receiving surface being formed on an axial side thereof, said second thrust receiving portion having an axial width larger than that of said second annular flange, said second thrust receiving surface being configured to contact said first thrust receiving surface;

a one-way clutch body disposed between said first and second annular flanges, and being subjected to an axial load in a locked state to inhibit rotation of said stator only in one direction; and a snap ring being fitted into a groove formed in said first or second support member to contact an axial side of said first or second support member without said groove.

2. The stator support structure according to claim 1, wherein said one-way clutch body includes a plurality of notches formed in said first annular flange of said first support member and a plurality of ratchet claws arranged within a plurality of circumferentially spaced concavities formed in said second annular flange, said ratchet claws having ends arranged to engage said notches in one of the rotating directions to prevent relative rotation between said first and second annular flanges and to escape from said first annular flange in the other one of the rotating directions.

3. The stator support structure according to claim 1, wherein
said stator and said second support member are made of resin.

4. The stator support structure according to claim 1, herein
said first support member has a cylindrical portion located on an inner periphery of said first support member, and
said second support member has a socket portion located at inner periphery of said second support member, said cylindrical portion is configured to fit into said socket portion in an axial direction.

5. The stator support structure according to claim 1, further comprising
a first thrust bearing is arranged between said first support member and an impeller hub.

6. The stator support structure according to claim 5, further comprising
a second thrust bearing is arranged between said second support member and a turbine hub.

7. The stator support structure according to claim 6, wherein
said one-way clutch body includes a plurality of notches formed in said first annular flange of said first support member and a plurality of ratchet claws arranged within a plurality of circumferentially spaced concavities formed in said second annular flange, said ratchet claws having ends arranged to engage said notches in one of the rotating directions to prevent relative rotation between said first and second annular flanges and to escape from said first annular flange in the other one of the rotating directions.

8. The stator support structure according to claim 7, wherein
said stator and said second support member are made of resin.

9. The stator support structure according to claim 1, further comprising
a thrust bearing is arranged between said second support member and a turbine hub.

10. The stator support structure according to claim 9, wherein
said one-way clutch body includes a plurality of notches formed in said first annular flange of said first support member and a plurality of ratchet claws arranged within a plurality of circumferentially spaced concavities formed in said second annular flange, said ratchet claws having ends arranged to engage said notches in one of the rotating directions to prevent relative rotation between said first and second annular flanges and to escape from said first annular flange in the other one of the rotating directions.

11. The stator support structure according to claim 10, wherein
said stator and said second support member are made of resin.

12. A torque converter adapted to be used to transmit torque from a power input shaft to an output shaft, said torque converter comprising:

a front cover adapted to be coupled to the power input;
an impeller connected to said front cover to form a hydraulic chamber together with said front cover, said impeller having an impeller hub;
a turbine disposed opposite said impeller and disposed inside said hydraulic chamber, said turbine having a turbine hub being adapted to be coupled to the output shaft, said front cover and said turbine forming a space therebetween; and
a stator disposed between said impeller and said turbine, said stator having a stator support structure arranged to coupling said stator to a stationary shaft and supporting said stator on said impeller hub and said turbine hub, said stator support structure comprising,
a first support member having a first annular flange and a first thrust receiving portion, said first annular flange being configured to receive nonrotatably a stationary shaft and extend radially outward from the stationary shaft, said first annular flange having said first thrust receiving portion unitarily formed on said first annular flange, said first thrust receiving portion having an axial width smaller than that of said first annular flange, said first thrust receiving portion having a first thrust receiving surface formed on an axial side thereof, said first thrust receiving portion being configured to receive a thrust load,
a second support member having a second annular flange and a second thrust receiving portion, said second annular flange extending radially inward from an inner peripheral portion of a stator, said second annular flange having said second thrust receiving portion unitarily formed on said second annular flange, said second thrust receiving portion having a second thrust receiving surface being formed on an axial side thereof, said second thrust receiving portion having an axial width larger than that of said second annular flange, said second thrust receiving surface being configured to contact said first thrust receiving surface, said second annular flange being positioned to be axially opposed to said first annular flange, said second thrust receiving portion contacting said first thrust receiving portion to receive the thrust load,
a one-way clutch body disposed between said first and second annular flanges, and being subjected to an axial load in a locked state to inhibit rotation of said stator only in one direction; and
a snap ring being fitted into a groove formed in said first or second support member to contact an axial side of said first or second support member without said groove.

13. The torque converter according to claim 12, wherein said stator and said second support member are made of resin.

14. The torque converter according to claim 12, wherein said one-way clutch body includes a plurality of notches formed in said first annular flange of said first support member and a plurality of ratchet claw arranged within a plurality of circumferentially spaced concavities formed in said second annular flange, said ratchet claws having ends arranged to engage said notches in one of the rotating directions to prevent relative rotation between said first and second annular flanges and to escape from said first annular flange in the other one of the rotating directions.

15. The torque converter according to claim 12, further comprising a first thrust bearing is arranged between said first support member and said impeller hub.

16. The torque converter according to claim 15, further comprising a second thrust bearing is arranged between said second support member and said turbine hub.

17. The torque converter according to claim 16, wherein said one-way clutch body includes a plurality of notches formed in said first annular flange of said first support member and a plurality of ratchet claws arranged within a plurality of circumferentially spaced concavities formed in said second annular flange, said ratchet claws having ends arranged to engage said notches in one of the rotating directions to prevent relative rotation between said first and second annular flanges and to escape from said first annular flange in the other one of the rotating directions.

18. The torque converter according to claim 17, wherein said stator and said second support member are made of resin.

19. The torque converter according to claim 12, further comprising a thrust bearing is arranged between said second support member and said turbine hub.

20. The torque converter according to claim 19, wherein said one-way clutch body includes a plurality of notches formed in said first annular flange of said first support member and a plurality of ratchet claws arranged within a plurality of circumferentially spaced concavities formed in said second annular flange, said ratchet claws having ends arranged to engage said notches in one of the rotating directions to prevent relative rotation between said first and second annular flanges and to escape from said first annular flange in the other one of the rotating directions.

21. The torque converter according to claim 20, wherein said stator and said second support member are made of resin.

* * * * *